United States Patent Office 2,758,004
Patented Aug. 7, 1956

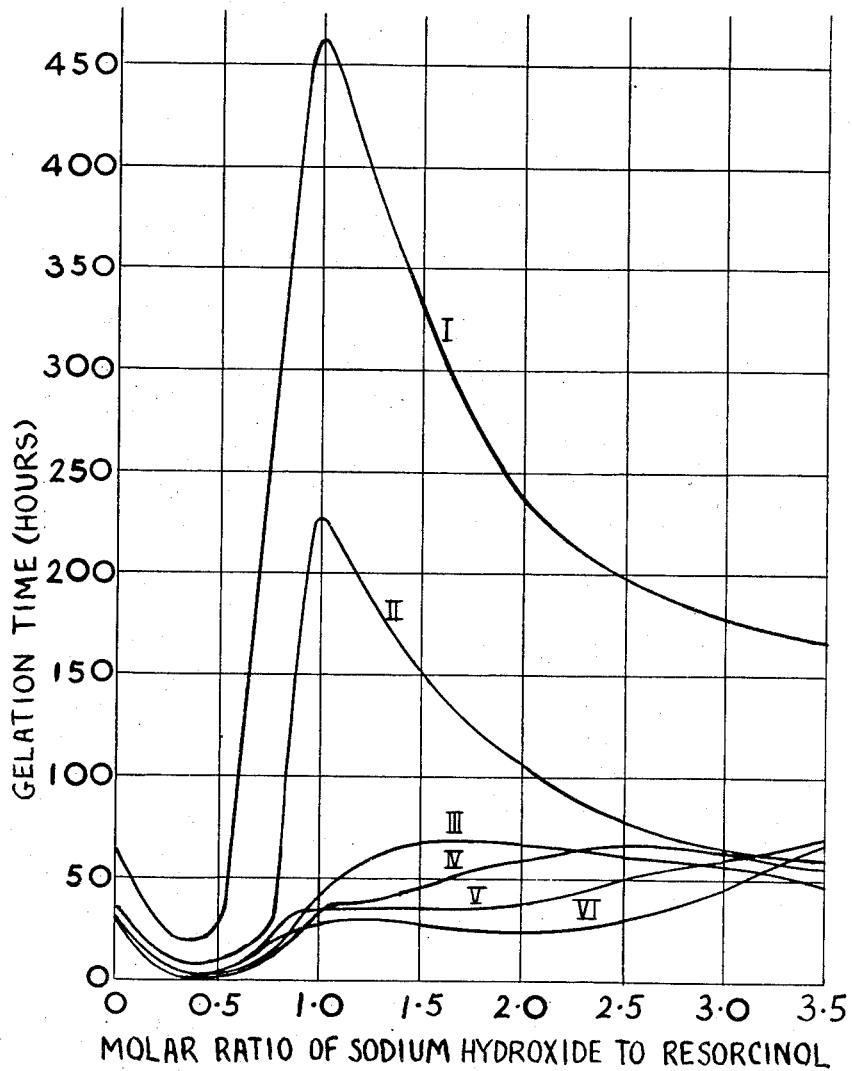

2,758,004

SPINNING VISCOSE CONTAINING RESORCINOL-FORMALDEHYDE

Ernest Edward Tallis and Brian C. Gardner, Coventry, England, assignors to Courtaulds Limited, London, England, a British company Application November 25, 1952, Serial No. 322,374

Claims priority, application Great Britain December 14, 1951

4 Claims. (Cl. 18—54)

This invention relates to the bonding of rubber to viscose rayon yarns and is particularly concerned with the production of viscose rayon yarns having an inherently satisfactory adhesion to rubber.

It is known that certain resinous compounds have the property of improving the adhesion of rayon to rubber. Thus British patent specification No. 477,380 describes the treatment of tyre cords with aqueous solutions or dispersions of heat-hardening aldehyde resin-forming substances such as phenolic resins, examples being resorcinol-formaldehyde condensation products.

It has also been proposed in British patent specification No. 582,210 to prepare composite products of rubber and rayon from rayon yarns which have been formed from viscose containing a heat-hardening aldehyde resin in an amount not exceeding 5 per cent by weight of the cellulose content of the viscose. When incompletely condensed resin-forming compositions are added to viscose the caustic soda in the viscose acts as a catalyst for further condensation possibly resulting in gelling of the resin. Consequently the spinning of viscose containing such compositions requires strict control in order to avoid the production of non-uniform products and the blocking of pipe lines and jet holes.

An object of the present invention is to avoid the need for such strict control in the spinning process by the use of particular incompletely condensed resorcinol-formaldehyde resin solutions of sufficient stability for technical use.

According to the present invention, a process for the production of viscose rayon yarns having an improved adhesion to rubber comprises delivering a main viscose stream to a jet immersed in an aqueous coagulating bath and injecting into this main stream just before it reaches the spinning machine an aqueous caustic soda solution of an incompletely condensed heat-hardenable resorcinol-formaldehyde resin in which the molar ratio of resorcinol to formaldehyde is within the range of 1:1.3 to 3.5 and the molar ratio of resorcinol to caustic soda is within the range of 1:1.0 to 3.5 and preferably in the range of 1:1.5 to 3.5.

The present invention uses the method of injecting a composition into a main viscose stream as described in United States patent specification No. 1,823,769.

The proportion of resin in the solution is preferably within the range of 5 to 15 per cent by weight, the actual amount used depending on the weight of resin required in the finished yarn; 0.5 to 3 per cent by weight of resin based on the dry weight of the yarn is usually sufficient.

The present invention is based on observations that the resin solutions as defined are sufficiently stable to permit their use as injector solutions in continuous or interrupted production of viscose yarn; thus the solutions as defined generally have a useful life of at least 24 hours at 15° centigrade. The stability of such solutions may be illustrated by way of examples by reference to experiments the results of which are shown graphically in the accompanying drawing. The solutions in all cases were prepared using technical high grade resorcinol and caustic soda, and a technical grade 37 per cent solution of formaldehyde. Aqueous solutions containing both resorcinol and formaldehyde were prepared, the final compositions of these solutions with respect to resorcinol and formaldehyde being given in the table below:

| No. of reference to graph in drawing | Resorcinol, percent by weight | Formaldehyde, percent by weight | Molar ratio of formaldehyde to resorcinol |
|---|---|---|---|
| I | 6.74 | 2.76 | 1.5 |
| II | 9.0 | 3.68 | 1.5 |
| III | 8.64 | 4.71 | 2.0 |
| IV | 8.20 | 5.60 | 2.5 |
| V | 7.81 | 6.38 | 3.0 |
| VI | 7.81 | 7.66 | 3.5 |

Varying amounts of caustic soda were then incorporated in the solutions and the time was taken for gelling of the solutions to occur in each case, the solutions being kept at a temperature of 25° centigrade throughout.

It will be seen from the graphs that when the molar ratio of the caustic soda to resorcinol reaches about 1.0:1 the stability of the solutions is much greater than that of solutions in which the molar ratio is below about 1.0:1.

We have also found that if the feed pipes for the injector unit are made of iron, certain resin solutions have a pronounced tendency to form gels with viscose at ordinary temperatures when kept in contact with iron. Further investigations which we have carried out show that when the molar proportion of caustic soda to resorcinol is within the range of 1.5 to 3.5:1 the tendency of the resin solution to form gels is practically eliminated whereas solutions outside this range usually gel after about four hours contact with viscose and iron.

Accordingly the present invention provides that if an injector unit is constructed of a non-ferrous alloy, the caustic soda to resorcinol molar range should be 1.0 to 3.5:1 but if the unit is constructed of iron, the molar range should be 1.5 to 3.5:1.

The yarns of the present invention may be applied in the construction of tyres and similar articles made from synthetic as well as natural rubber products, such as for example, the synthetic rubbers obtained by polymerising butadiene with other polymerisable compounds such as styrene or acrylonitrile.

It is one advantage of the present invention that there is no contamination of viscose-making and storage-plant with resin. A further advantage is that whereas yarn which has been treated with similar resinous compositions after it has been spun from viscose has a stiff and harsh handle, yarn prepared according to the present invention is flexible and such flexibility facilitates further processing, such as for example, the twisting of the yarn in the preparation of cord.

The invention is illustrated by the following examples in which parts and percentages are by weight:

*Example 1*

An aqueous alkaline resin solution was prepared by dissolving resorcinol in an aqueous solution of sodium hydroxide and then adding formaldehyde as a commercial "Formalin" solution containing about 37 per cent of formaldehyde, the solution being cooled during the addition of the formaldehyde solution to prevent excessive rise in temperature. The quantities used were such that the composition of the aqueous solution was 9 per cent of resorcinol, 3.68 per cent of formaldehyde, and 6.56 per cent of sodium hydroxide, corresponding to a molar ratio of formaldehyde to resorcinol of 1.5:1, and a molar ratio of sodium hydroxide to resorcinol of 2.0:1.

This solution was allowed to stand for 8 hours at 20° centigrade and was then injected as described in United States patent specification No. 1,823,769, into a mature viscose containing 7.4 per cent of cellulose and 6.5 per cent of sodium hydroxide as it was being extruded to form a thread which was then stretched as described in United States patent specification No. 2,192,074 to give a thread of 1180 denier and comprising 500 filaments. The yarn was washed free from acid and other impurities and dried, but was not subjected to an alkaline desulphurising treatment. The injection ratio of aqueous alkaline resin solution to the viscose was 1 part of resin solution to 99 parts of viscose giving about 1.5 per cent of resin based on the dry weight of the yarn. The yarn was twisted into cord in the following manner. The twist of the thread was increased to thirteen turns per inch and then two such threads were combined by twisting together in the opposite direction until a twist of eleven turns per inch was obtained. The adhesion of this cord to rubber was evaluated by the "H" test using the procedure proposed in the Report AIC 99 "Study of the 'H' Test for Evaluating the Adhesive Properties of Tyre Cord in Natural and GRS Rubbers," by W. James Lyons, Mary L. Nelson and Carl M. Conrad, issued by the United States Department of Agriculture in October 1945.

The pull required for cords prepared according to the example was 4.53 kg. whereas the pull for an untreated viscose yarn was 3.05 kg.

*Example 2*

An aqueous alkaline resin solution was prepared as described in Example 1, the quantities used being such that the solution contained 9.0 per cent of resorcinol, 3.20 per cent of formaldehyde and 3.27 per cent of sodium hydroxide corresponding to a molar ratio of formaldehyde to resorcinol of 1.3:1 and a molar ratio of caustic soda to resorcinol of 1:1. The solution was allowed to stand for 72 hours at 20° centigrade before injection into a mature viscose containing 7.4 per cent cellulose and 6.5 per cent caustic soda, the viscose then being extruded and treated as described in Example 1 to give a thread of 1180 denier and comprising 500 filaments. The injection ratio of aqueous alkaline resin solution to viscose was 1 part of resin solution to 99 parts of viscose giving about 1.45 per cent of resin based on the dry weight of the yarn. The yarn was washed free from impurities, dried and twisted into cord in the manner described in Example 1. The adhesion of the cord to rubber was evaluated as described in Example 1, the pull required for cords prepared according to the example being 4.00 kg. whereas that of an untreated viscose yarn was 2.98 kg.

*Example 3*

An aqueous alkaline resin solution was prepared as described in Example 1 and the quantities used were such that the solution contained 3.91 per cent of resorcinol, 3.73 per cent of formaldehyde, and 4.97 per cent of sodium hydroxide corresponding to a molar ratio of formaldehyde to resorcinol of 3.5:1 and a molar ratio of sodium hydroxide to resorcinol of 3.5:1. The solution was allowed to stand for 24 hours at 16° centigrade before injection into a mature viscose containing 7.4 per cent of cellulose and 7.0 per cent of sodium hydroxide as described in Example 1, the viscose then being extruded and treated further as described in Example 1 to give a thread comprised of 750 filaments and 1750 denier. The injection ratio of aqueous alkaline resin solution to viscose was 1 part of resin solution to 134.5 parts of viscose to give about 0.5 per cent of resin based on the dry weight of the yarn. The yarn was washed free from impurities, dried and twisted into cord in the manner described in Example 1 to give a cord having a twist of 12 turns per inch in the single thread, two such threads being twisted together until a twist of 12 turns per inch was obtained. The adhesion of this cord to rubber was evaluated as described in Example 1; the pull required for cords prepared according to the Example was 4.42 kg. whereas the pull for an untreated viscose cord was 3.54 kg.

*Example 4*

An aqueous alkaline resin solution was prepared as described in Example 1, its composition being 8.20 per cent of resorcinol, 5.59 per cent of formaldehyde and 7.45 per cent of sodium hydroxide corresponding to a molar ratio of formaldehyde to resorcinol of 2.5:1 and a molar ratio of sodium hydroxide to resorcinol of 2.5:1. The solution was allowed to stand for 26 hours at 16° centigrade before injection into a mature viscose containing 7.4 per cent of cellulose and 7.0 per cent of sodium hydroxide as described in Example 1, the viscose then being extruded and further treated as described in Example 1 to give a thread of 1750 denier and comprised of 750 filaments. The injection ratio of aqueous alkaline resin solution to viscose was 1 part of resin solution to 91 parts of viscose to give about 1.5 per cent of resin based on the dry weight of the yarn. The yarn was washed free from impurities, dried and twisted into cord as described in Example 1; the cord had the same construction as that of Example 3. The adhesion of this cord to rubber was evaluated as described in Example 1; the pull required for cord prepared according to this example was 4.87 kg. whereas the pull for a similar cord prepared from an untreated viscose yarn was 3.36 kg.

*Example 5*

An aqueous alkaline resin solution was prepared as described in Example 1; its composition was 11.25 per cent of resorcinol, 4.60 per cent of formaldehyde and 8.19 per cent of sodium hydroxide, corresponding to a molar ratio of formaldehyde to resorcinol of 1.5:1 and a molar ratio of sodium hydroxide to resorcinol of 2.0:1. The solution was allowed to stand for 30 hours at 16° centigrade before being injected as described in Example 1 into a mature viscose containing 7.4 per cent of cellulose and 7.0 per cent of sodium hydroxide to give a thread of 1750 denier and comprising 750 filaments. The injection ratio of aqueous alkaline resin solution to viscose was 1 part of resin solution to 62.5 parts of viscose to give about 3.0 per cent of resin based on the dry weight of the yarn. The yarn was washed free from impurities, dried and twisted into cord in the manner of Example 1, the cord having the same construction as that described in Example 3. The adhesion of this cord to rubber was evaluated as described in Example 1. The pull required for cord prepared according to this example was 5.68 kg. whereas that of a similar cord prepared from untreated viscose yarn was 3.44 kg.

What we claim is:

1. A process for the production of viscose rayon yarns containing a resorcinol-formaldehyde resin and having an improved adhesion to rubber comprising delivering a main viscose stream to a jet immersed in an aqueous coagulating bath and injecting into this main stream just before it reaches the spinning machine an aqueous caustic soda solution of an incompletely condensed heat-hardenable resin consisting essentially or resorcinol and formaldehyde, the molar ratio of resorcinol to formaldehyde lying within the range of 1:1.3 to 3.5 and the molar ratio of resorcinol to caustic soda lying within the range of 1:1.0 to 3.5.

2. A process for the production of viscose rayon yarns containing a resorcinol-formaldehyde resin and having an improved adhesion to rubber comprising delivering a main viscose stream to a jet immersed in an aqueous coagulating bath and injecting into this main stream just before it reaches the spinning machine an aqueous caustic soda solution of an incompletely condensed heat-hardenable resin consisting essentially of resorcinol and formaldehyde, the molar ration of resorcinol to formaldehyde lying within the range of 1:1.3 to 3.5 and the molar ratio of resorcinol to caustic soda lying within the range of 1:1.5 to 3.5.

3. The process claimed in claim 2 in which the aqueous caustic soda solution is brought into contact with iron immediately prior to its injection into the main stream.

4. A process as claimed in claim 2 wherein the proportion of resin in the injected aqueous caustic soda resin solution is within the range of 5 to 15 per cent by weight.

References Cited in the file of this patent

UNITED STATES PATENTS

| | | |
|---|---|---|
| 1,823,769 | Stokes | Sept. 15, 1931 |
| 1,955,825 | Palmer | Apr. 24, 1934 |
| 2,168,335 | Heckert | Aug. 8, 1939 |

FOREIGN PATENTS

| | | |
|---|---|---|
| 582,210 | Great Britain | Nov. 8, 1946 |